US011707015B2

(12) United States Patent
Thybaut

(10) Patent No.: US 11,707,015 B2
(45) Date of Patent: Jul. 25, 2023

(54) ASSEMBLY FOR A DOSING SYSTEM OF A SPREADER MACHINE FOR DISTRIBUTING A GRANULAR MATERIAL OR THE LIKE, DOSING SYSTEM AND SPREADER MACHINE

(71) Applicant: Kverneland Group Nieuw-Vennep B.V., Nieuw-Vennep (NL)

(72) Inventor: Maarten Thybaut, Hillegom (NL)

(73) Assignee: KVERNELAND GROUP NIEUW-VENNEP B.V., Nieuw-Vennep (NL)

( * ) Notice: Subject to any disclaimer, the term of this patent is extended or adjusted under 35 U.S.C. 154(b) by 396 days.

(21) Appl. No.: 16/709,177

(22) Filed: Dec. 10, 2019

(65) Prior Publication Data
US 2020/0217704 A1     Jul. 9, 2020

(30) Foreign Application Priority Data

Jan. 9, 2019    (EP) ..................................... 19150946

(51) Int. Cl.
| A01C 17/00 | (2006.01) |
| G01F 13/00 | (2006.01) |
| A01C 19/00 | (2006.01) |

(52) U.S. Cl.
CPC .......... *A01C 17/006* (2013.01); *A01C 17/008* (2013.01); *A01C 19/00* (2013.01); *G01F 13/001* (2013.01); *A01C 17/001* (2013.01)

(58) Field of Classification Search
CPC ... A01C 17/001; A01C 17/006; A01C 17/008; A01C 19/00; G01F 13/001
See application file for complete search history.

(56) References Cited

U.S. PATENT DOCUMENTS

| 1,919,619 A | * | 7/1933 | Allan, I | ................. | E01C 19/203 |
| | | | | | 239/687 |
| 5,160,119 A | * | 11/1992 | Lemire | ................... | F16K 3/029 |
| | | | | | 138/94.3 |

(Continued)

FOREIGN PATENT DOCUMENTS

| DE | 102007045905 A1 * | 4/2009 | ........... A01C 17/006 |
| DE | 102007045905 A1 | 4/2009 | |

(Continued)

OTHER PUBLICATIONS

Extended European Search Report in reference to co-pending European Patent Application No. EP 19150946 filed Oct. 7, 2019.

*Primary Examiner* — Manuel A Rivera Vargas
*Assistant Examiner* — Yaritza H Perez Bermudez
(74) *Attorney, Agent, or Firm* — Leason Ellis LLP

(57) ABSTRACT

Disclosed is an assembly for a dosing system of a spreader machine for distributing a granular material or the like, which comprises first and second members provided with first and second openings, respectively, and an actuator connected to at least one of the first and second members and configured to provide a driving force between the first and second members, thereby, adjusting an opening size of a dosing opening provided by an overlapping area between the first and second openings. The first and second members are moveable by relative movement into a first position providing the dosing opening with a first opening size and a second position, different from the first position, providing the dosing opening with a second opening size different from the first opening size, wherein a center portion of the dosing opening is locally fixed when the members are moved between the first and second positions.

10 Claims, 7 Drawing Sheets

(56) References Cited

U.S. PATENT DOCUMENTS

| | | | | |
|---|---|---|---|---|
| 5,501,405 A | * | 3/1996 | Doornek | A01C 15/007 |
| | | | | 239/683 |
| 7,766,257 B2 | * | 8/2010 | Gamble, II | A01C 17/006 |
| | | | | 239/172 |
| 8,074,904 B1 | * | 12/2011 | Hobbs | A01C 17/006 |
| | | | | 239/652 |
| 8,657,208 B2 | | 2/2014 | Kost | |
| 2006/0113740 A1 | * | 6/2006 | Green | B60G 21/0556 |
| | | | | 280/124.107 |
| 2010/0200680 A1 | * | 8/2010 | Hobbs, Jr. | A01C 17/006 |
| | | | | 239/687 |

FOREIGN PATENT DOCUMENTS

| | | |
|---|---|---|
| DE | 102010007794 A1 | 10/2011 |
| FR | 1097241 A | 7/1955 |
| RU | 63521 U1 | 5/2007 |

\* cited by examiner

ASSEMBLY FOR A DOSING SYSTEM OF A SPREADER MACHINE FOR DISTRIBUTING A GRANULAR MATERIAL OR THE LIKE, DOSING SYSTEM AND SPREADER MACHINE

TECHNICAL FIELD

The present disclosure refers to an assembly for a dosing system of a spreader machine for distributing a granular material or the like, a dosing system, and a spreader machine, specifically an agricultural spreader machine.

BACKGROUND

Spreader or distributing machines are used for distributing a granular material or the like. In case of an agricultural spreader machine a fertilizer may be distributed. Document EP 0 511 714 A2 refers to a spreader machine which is provided with an arrangement comprising a spreader disk. The granular material to be distributed by the spreader machine is received in a storage container or tank. From the storage container the granular material is provided to the spreader disk. On its way from the storage container to the spreader disk the granular material is dosed by a dosing system, thereby, controlling the amount of granular material distributed per time.

SUMMARY

The present disclosure relates to an assembly for a dosing system of a spreader machine for distributing a granular material or the like, a dosing system, and a spreader machine which allow for improved dosing of the material to be distributed.

According to one aspect, an assembly for a dosing system of a spreader machine for distributing a granular material or the like is disclosed. The assembly comprises: a first member provided with a first opening; a second member provided with a second opening; and an actuator connected to at least one of the first and second members and configured to provide a driving force for relative movement between the first and second members, thereby, adjusting an opening size of a dosing opening provided by an overlapping area in which the first and second openings are overlapping. The first and second members are moveable by the relative movement into a first position providing the dosing opening with a first opening size and a second position different from the first position and providing the dosing opening with a second opening size different from the first opening size, wherein a center portion of the dosing opening being locally fixed when the first and second members are moved between first and second positions.

According to another aspect, a dosing system for a spreader machine for distributing a granular material or the like is disclosed, the dosing system comprises the above disclosed assembly.

According to still a further aspect, a spreader machine for distributing a granular material or the like is disclosed, the spreader machine comprising: a storage container for receiving a granular material to be distributed, a spreading device configured for distributing the granular material, and the above disclosed dosing system configured for dosing the granular material received from the storage container to the spreading device.

The relative movement provided for the first and second members allows for fine adjustment (fine-tuning) of the size of the dosing opening which is defined by the overlapping area for the first and second openings, the overlapping area being adjusted according to the relative position between the first and second members. Linear movement can be applied in small steps supporting exact dosing of the granular material.

If the first and the second members are provided in a first relative position or orientation to each other, the opening size of the dosing opening is provided with a first size. Changing the relative position or orientation of the first and second members to each other will provide them in a second relative position, thereby, establishing a second opening size of the dosing opening different from the first opening size. For amending or adjusting the size the overlapping area in which the first and second openings are overlapping is adjusted. A closed position may be provided for the dosing opening if there is no overlapping between the first and second openings.

The center (portion, spot or area) of the dosing opening is kept in a non-moved or non-relocated position. If a spreading device located underneath of the assembly does not change its relative position to the assembly, such fixing of the center portion of the dosing opening may ensure keeping a center of the discharging of the granular material to the spreading device while the opening size of the dosing opening is adjusted by relative movement between the first and second members.

With regard to a throughput of the granular material through the dosing opening, a throughput of at least about 300 kg/min may be provided in operation.

The assembly may comprise a guiding mechanism configured for linearly guiding at least one of the first and second members for the linear movement. The guiding mechanism provided for guidance while the at least one of the members is moved may comprise one or more guiding slots provided, for example, in at least one of the first and second members. Within such guiding slot a pin or projection may be received and guided while the linear movement or motion is conducted.

The assembly may further comprise a first hinge connecting the actuator to the first member. The first hinge may comprise one or more lever arms for connecting the actuator to the first member. In an example an extracting and retracting actuator element of the actuator may be connecting to the first hinge, and, thereby, functioning together with the first hinge for driving linear movement or motion.

The assembly may comprise a second hinge connecting the actuator to the second member. The embodiments or design options outlined for the first hinge above may apply to the second hinge mutatis mutandis.

The second member may be forced movable (forced movement) in response to movement of the first member, the movement driven by the actuator. If the first member is driven to be moved, such motion of the first member will forcibly cause movement of the second member. In this case relative movement between the first and second members comprises moving both the first and second members. It may be similarly foreseen that the first member is forced to move in case the second member is driven for movement. Thus, synchronized movement or motion of the first and the second members may be applied.

At least one of the first and the second openings may be a square opening. At least one of the first and the second openings may be provided with a square opening having the same length on all sides of the opening, for example, on all four sides of the square opening.

The dosing opening may be a square opening. By the relative movement between the first and second members corner sections of the first and second openings provided opposite to each other may be moved in a closer or more distant position. The dosing opening may be provided with a quadratic opening shape (quadratic opening or hole).

A first shape of the dosing opening provided in the first position may be equal to a second shape of the dosing opening provided in the second position. In this embodiment, a first shape of the dosing opening, if the first and second openings are in a first overlapping position, is equal to a second shape of the dosing opening after the first and second openings moved to a second overlapping position different from the first overlapping position. By the relative movement between the first and second members (causing relative movement between the first and second openings) the type of shape of the opening may not change. For example, in the different relative positions between the first and second members the dosing opening may be provided with a square opening (shape). Still, depending on the relative position of the first and second members the dosing opening is provided with different opening size. Depending on the size of the dosing opening more or less granular material can pass through the doping dosing opening.

The first and second members may be configured to synchronously move while conducting the relative movement. With regard to such example or other embodiments, there may be a single actuator for moving both the first and the second members for relative movement. Alternatively, each of the first and second members may be assigned an individual actuator. The actuators may be controlled by a controller device, thereby, also allowing synchronized movement of the first and the second members.

In another example, the first and second members may be moved non-synchronously. For adjusting the size of the dosing opening, first the first member may be moved followed by movement of the second member for finally adjusting the dosing opening.

In the different embodiments, adjustment of the size of the dosing opening may be conducted by moving both the first and the second member.

The relative movement may be conducted or performed by linear movement of at least one of the first and second members. The linear movement or motion is provided by a one-dimensional motion or movement along a straight line. Alternatively, the relative movement may be conducted by applying rotational movement.

For providing the driving force for the relative movement between the first and second members, at least one of a cylinder extractable and retractable, and a toothed-wheel-rack mechanism may be provided. The cylinder may be provided with a hydraulic or a pneumatic cylinder. For the cylinder, a piston may be provided in chamber, the piston being connected to a piston rod which in operation can be extracted and retracted. With regard to the toothed-wheel-rack mechanism, the toothed-wheel may be driven by an electric motor. Two racks may be provided on opposite sides of the toothed-wheel, thereby, driving or moving both racks by rotating the toothed-wheel. The two racks may be connected to the first and the second members, thereby, causing relative movement between the first and second members if the toothed-wheel is driven.

At least one of the first member and the second member may be provided with a plate member. For this or other examples, the first and second members may be located above each other in a vertical direction. Plate members provided for both the and second members may be provided in a parallel position. It may be provided that the first and second members are sliding on each other in case of relative movement between the first and second members. With regard to the plate members or other embodiments, the first and second openings may be provided in a center area of the first and the second member, respectively.

The embodiments outlined above may apply to at least one of the dosing system and the spreader machine mutatis mutandis. The spreader machine may be an agricultural spreader machine for distributing, for example, a fertilizer.

BRIEF DESCRIPTION OF THE DRAWINGS

Further embodiments are described in further detail by referring to figures, which show:

FIG. 1 is a schematic representation of an arrangement of elements for a spreader machine for distributing a granular material or the like;

FIG. 2 is a schematic perspective view of an assembly for a dosing system of a spreader machine for distributing a granular material or the like;

FIG. 6 is a schematic top view of another assembly for a dosing system of a spreader machine for distributing a granular material or the like.

DETAILED DESCRIPTION

Figure 1:
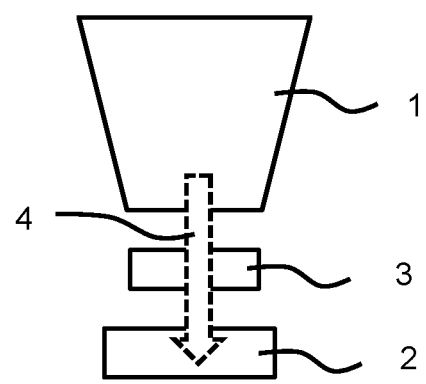
Figure 2:
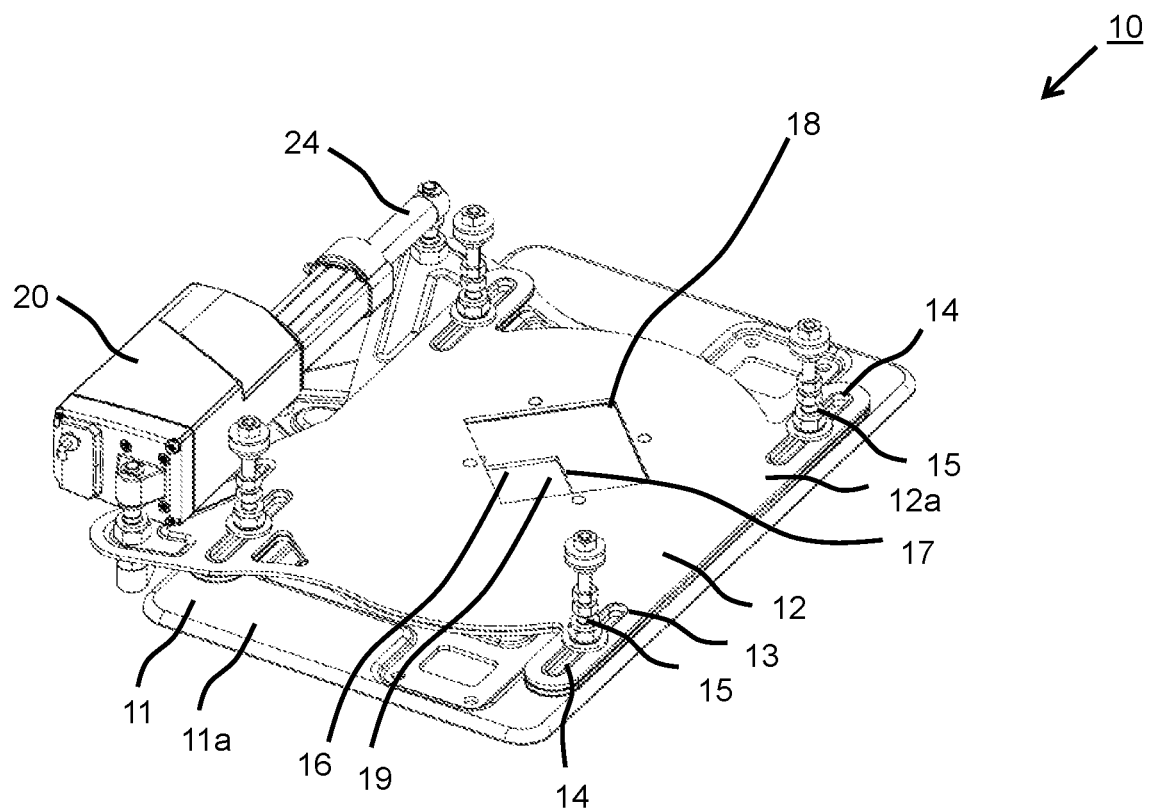
Figure 3:
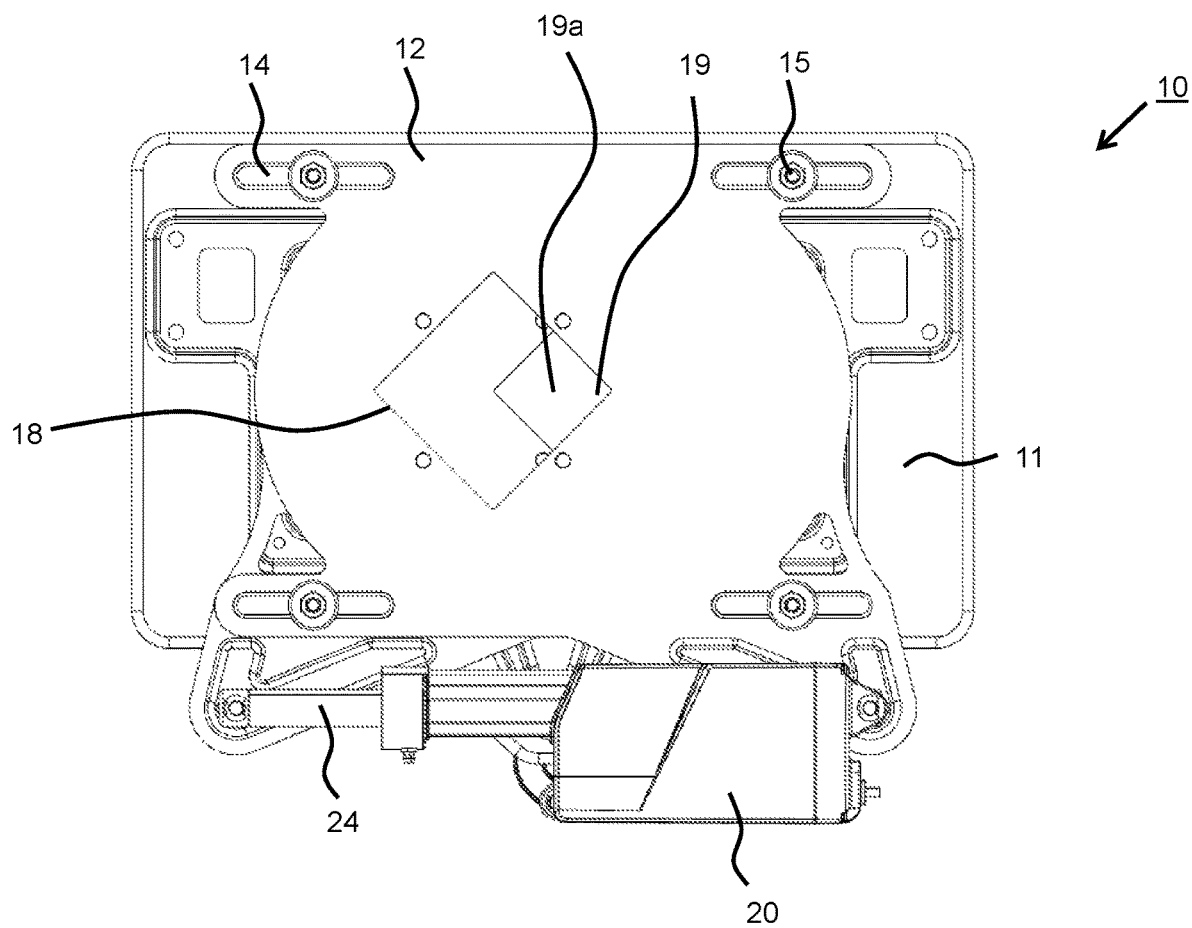
FIG. 3 is a top view of the assembly in FIG. 2.
Figure 4:
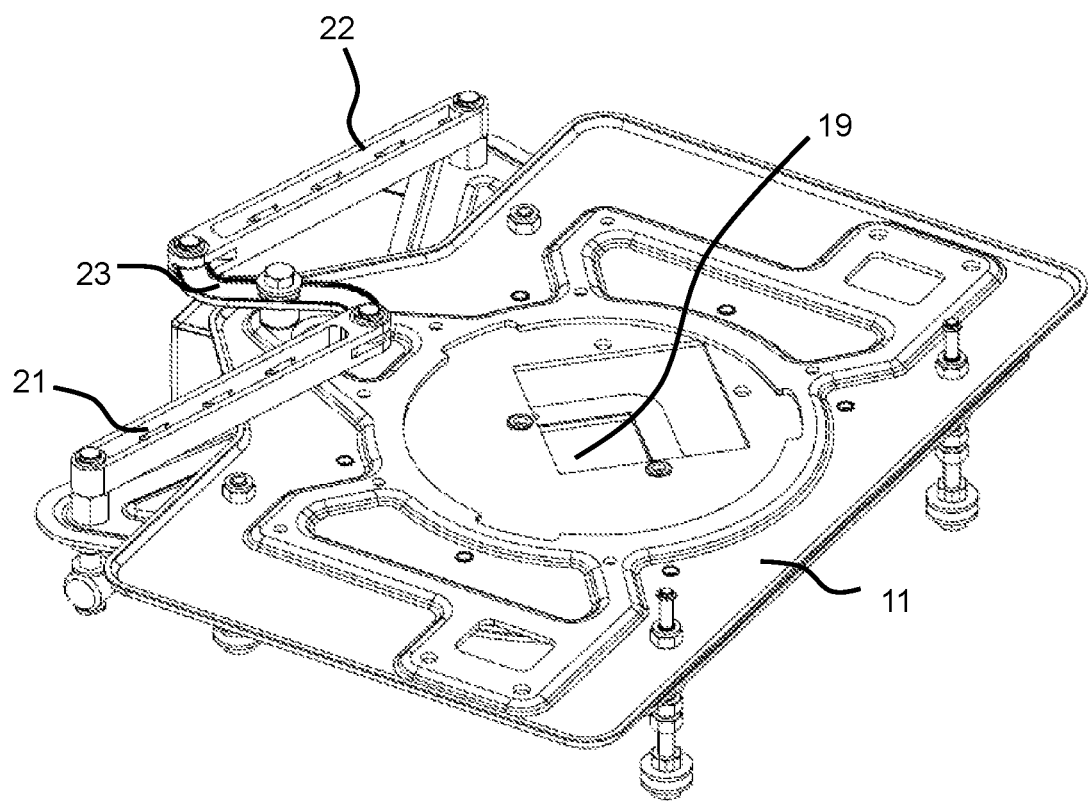
FIG. 4 is a perspective view from the bottom of the assembly in FIG. 2.
Figure 5:
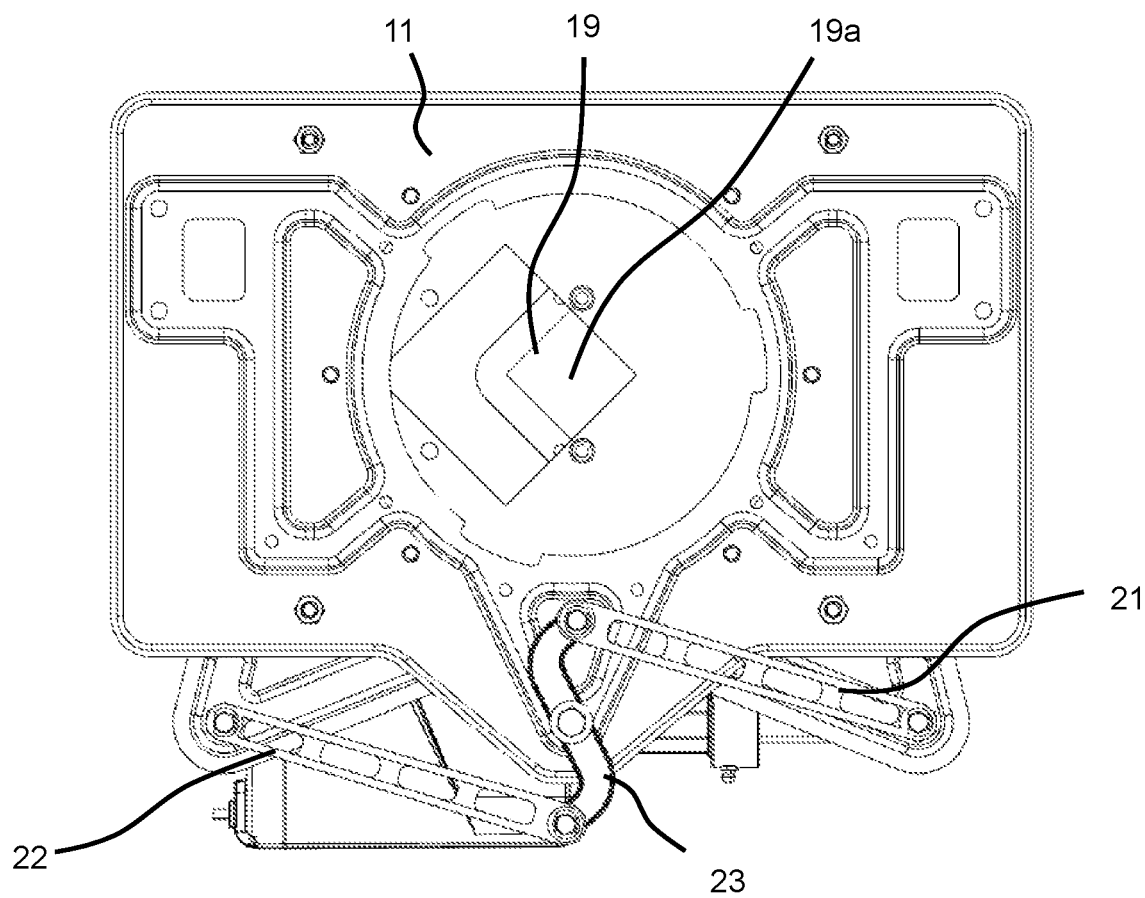
FIG. 5 is a bottom view of the assembly in FIG. 2.

FIG. 1 shows a schematic representation of an arrangement for a spreader or distributor machine such as an agricultural spreader machine, for example, for distributing a fertilizer material. Granular material to be distributed is received in a storage container or tank 1 which may be carried, for example, by a tractor or may be provided on an implement. For spreading or distributing the granular material it is provided to a spreading device 2 comprising, for example, one or two spreader disks as it is known as such for different types of spreader devices. For having the granular material provided from the storage container 1 to the spreading device 2 depending on the work situation, a dosing system 3 is provided between the storage container 1 and the spreader device 2. The granular material to be distributed is provided from the storage container 1 to the dosing system 3 which will dose the granular material to the spreader device 2. This is schematically shown in FIG. 1 by an arrow 4.

With reference to FIGS. 2 to 8, embodiments for an assembly for a dosing system for a spreader machine for distributing a granular material or the like are described. For example, the assembly may be applied in the arrangement depicted in FIG. 1.

FIGS. 2 to 5 show an assembly 10 for a dosing system of a spreader machine. A first member 11 and a second member 12 are provided above each other. In the example shown in FIG. 1 the first and the second member 11, 12 are provided with a plate member 11a, 12a. The first and the second members 11, 12 are movable relative to each other. In case of movement there is a guiding mechanism 13 provided with guiding slots 14 and guiding pins 15 for guiding or supporting linear movement.

By the linear movement an overlapping area 16 in which a first opening 17 provided in the first member 11 and a second opening 18 provided in the second member 12 are overlapping, thereby, providing a dosing opening 19. Through the dosing opening 19 the granular material to be distributed or spread can pass on its way from the storage container 1 to the spreading device 2 (see FIG. 1). By adjusting the overlapping area 16 regarding its size the dosing of the granular material can be controlled.

In the example shown both the first and the second openings 17, 18 are provided with a square opening shape. Also, the dosing opening 19 does have a square shape which is kept in the different relative positions between the first and the second member 11, 12.

A center portion or area 19a of the dosing opening is kept in a fixed location if the first and second members 11, 12 are moved relative to each other, for example, by synchronous movement.

For causing relative linear movement between the first and the second members 11, 12 there is an actuator 20 coupling to both the first and the second members 11, 12. There are hinges 21, 22 connecting to a lever arm 23 (see FIGS. 4 and 5). Consequently, if a rod element 24 of the actuator 20 is extracted or retracted both the first and the second member 11, 12 will be forced to linearly move, thereby, adjusting the size of the dosing opening 19. A center portion of the dosing opening 19 will be kept in the same position (not moving).

Figure 6:
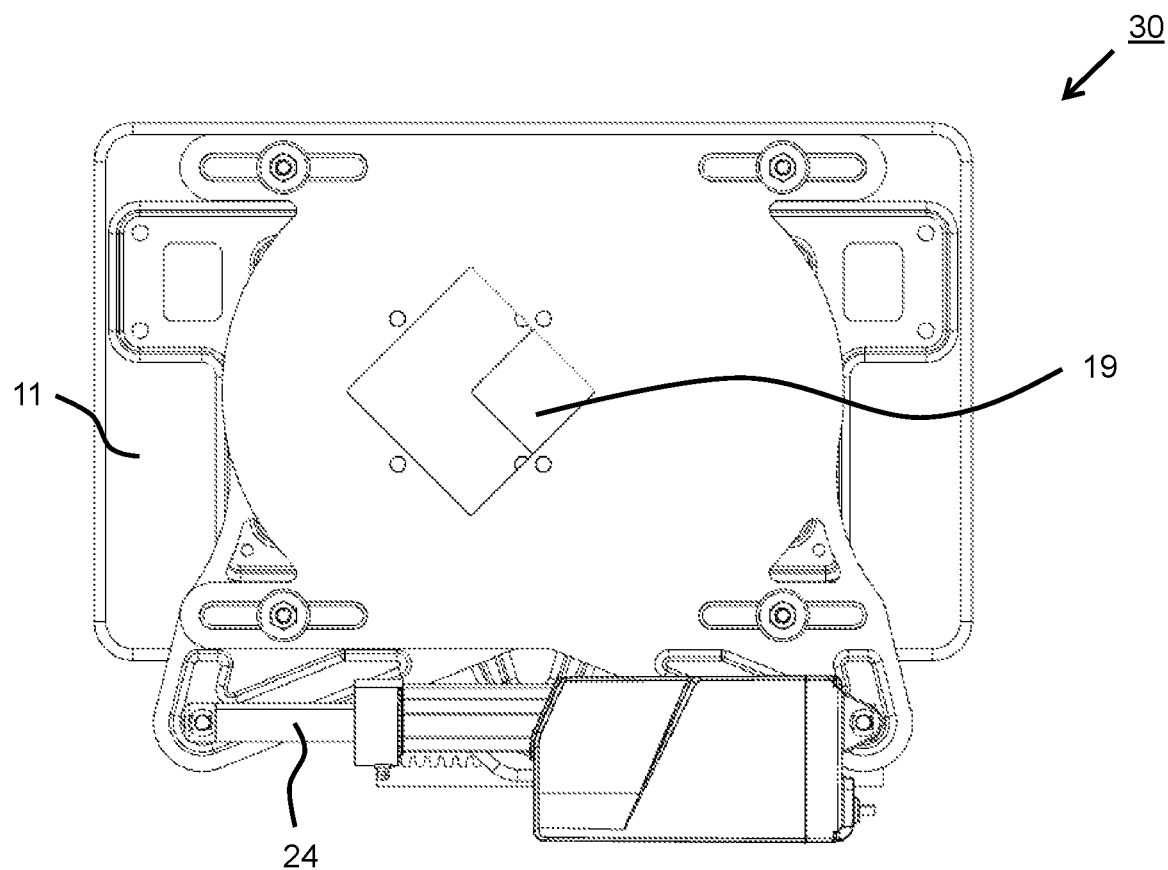
Figure 7:
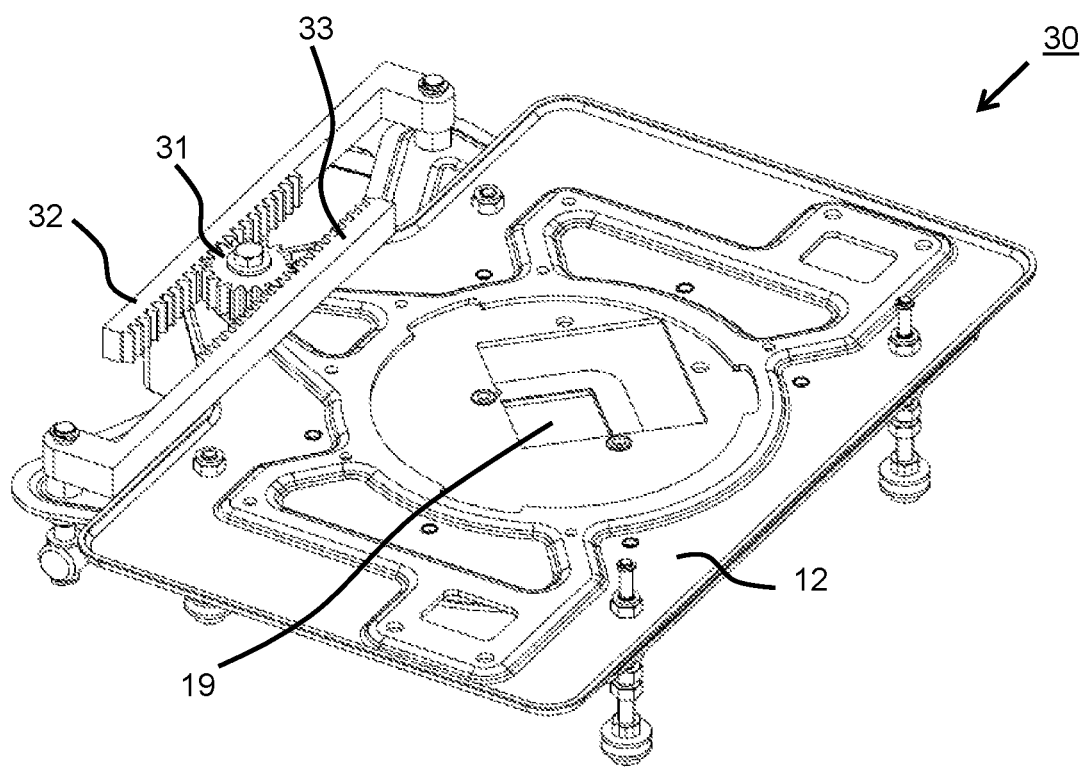
FIG. 7 is a schematic bottom view of the further assembly from FIG. 6.

Referring to FIGS. 6 and 7, another assembly for a dosing system of the spreader machine is depicted. In FIGS. 6 and 7 the same reference numeral are applied to the same features like in FIGS. 2 to 5. In step of the combination of the hinges 21, 22 and the lever arm 23 there is a toothed-wheel 31 interacting with two racks 32, 33 provided on opposite sides of the toothed-wheel 31. Again, if the actuator provides a driving force, both the first and the second members 11, 12 are linearly moved relative to each other.

The features disclosed in this specification, the figures and/or the claims may be material for the realization of various embodiments, taken in isolation or in various combinations thereof.

What is claimed is:

1. An assembly for a dosing system of a spreader machine for distributing a granular material, comprising:
a first member provided with a first opening;
a second member provided with a second opening; and
an actuator connected to at least one of the first and second members and configured to provide a driving force for relative movement conducted by linear movement between the first and second members to adjust an opening size of a dosing opening for passing the granular material therethrough, the dosing opening provided by an overlapping area in which the first and second openings are overlapping, wherein the first and second members are configured to synchronously move while conducting the relative movement,
wherein the first and second members are configured to be moved by the relative movement into a first position providing the dosing opening with a first opening size and a second position different from the first position and providing the dosing opening with a second opening size different from the first opening size, wherein the first and second members are configured to keep a center portion of the dosing opening locally fixed while the first and second members are moved between the first and second positions, wherein the dosing opening provided in the first position is a square shape, and wherein the dosing opening provided in the second position is the square shape and wherein the first and second members are configured to provide the dosing opening with the square shape while the members move between the first and second positions.

2. The assembly according to claim 1, further comprising a guiding mechanism configured for linearly guiding at least one of the first and second members for the linear movement.

3. The assembly according to claim 1, further comprising a first hinge connecting the actuator to the first member.

4. The assembly according to claim 1, further comprising a second hinge connecting the actuator to the second member.

5. The assembly according to claim 1, wherein the second member is forced movable in response to movement of the first member, the movement driven by the actuator.

6. The assembly according to claim 1, wherein at least one of the first and second openings is provided with a square opening shape.

7. The assembly according to claim 1, wherein the actuator comprises, for providing the driving force for the relative movement between the first and second members, at least one of:
a cylinder extractable and retractable, and
a toothed-wheel-rack mechanism.

8. The assembly according to claim 1, wherein at least one of the first and second members is provided with plate member.

9. A dosing system for a spreader machine for distributing a granular material, comprising an assembly according to claim 1.

10. A spreader machine for distributing a granular material, comprising:
a storage container for receiving a granular material to be distributed;
a spreading device configured for distributing the granular material; and
a dosing system according to claim 9 configured for dosing the granular material received from the storage container to the spreading device.

* * * * *